US012448553B2

(12) United States Patent
Howe et al.

(10) Patent No.: US 12,448,553 B2
(45) Date of Patent: Oct. 21, 2025

(54) CURABLE COMPOSITION

(71) Applicant: Sunstar Engineering Americas Inc., Springboro, OH (US)

(72) Inventors: Stephen Eric Howe, Springboro, OH (US); Edward Thomas Lemen, Springboro, OH (US)

(73) Assignee: Sunstar Engineering Americas Inc., Springboro, OH (US)

( * ) Notice: Subject to any disclaimer, the term of this patent is extended or adjusted under 35 U.S.C. 154(b) by 236 days.

(21) Appl. No.: 18/261,968

(22) PCT Filed: Jan. 31, 2022

(86) PCT No.: PCT/IB2022/050799
§ 371 (c)(1),
(2) Date: Jul. 18, 2023

(87) PCT Pub. No.: WO2022/167907
PCT Pub. Date: Aug. 11, 2022

(65) Prior Publication Data
US 2024/0301261 A1    Sep. 12, 2024

Related U.S. Application Data

(60) Provisional application No. 63/145,520, filed on Feb. 4, 2021.

(51) Int. Cl.
| | | |
|---|---|---|
| C09J 175/16 | (2006.01) | |
| C08G 18/04 | (2006.01) | |
| C08G 18/12 | (2006.01) | |
| C09J 5/00 | (2006.01) | |

(52) U.S. Cl.
CPC ............ *C09J 175/16* (2013.01); *C08G 18/04* (2013.01); *C08G 18/12* (2013.01); *C09J 5/00* (2013.01)

(58) Field of Classification Search
CPC ........... C09J 175/16; C09J 5/00; C08G 18/04; C08G 18/12
USPC ........................................................ 156/247
See application file for complete search history.

(56) References Cited

U.S. PATENT DOCUMENTS

| | | |
|---|---|---|
| 6,284,826 B1 | 9/2001 | Kinoshita et al. |
| 2003/0149164 A1 | 8/2003 | Minnee et al. |
| 2015/0072083 A1* | 3/2015 | Nebioglu ............... C09D 5/008 427/520 |
| 2015/0267090 A1 | 9/2015 | Zajaczkowski et al. |
| 2017/0226300 A1 | 8/2017 | Reemers et al. |

FOREIGN PATENT DOCUMENTS

EP    2848656 A1    3/2015

OTHER PUBLICATIONS

Lee, S., et al., "English machine-translation by Clarivate Analytics of KR-20140073334-A, with full KR patent application included", C08G18/62, Jun. 16, 2014. (Year: 2014).*
International Preliminary Report on Patentability of related International Application No. PCT/IB2022/050799 dated Aug. 3, 2023 (English translation).
International Search Report for related International Application No. PCT/IB2022/050799 mailed Apr. 13, 2022.
Extended European Search Report (EESR) for corresponding European Application No. 22749317.8 dated Nov. 18, 2024.

* cited by examiner

*Primary Examiner* — S. Behrooz Ghorishi
*Assistant Examiner* — Gregory C. Grosso
(74) *Attorney, Agent, or Firm* — Renner, Otto, Boisselle & Sklar, LLP

(57) ABSTRACT

An object of the present invention is to provide a masking material having excellent peeling properties even if the drying step is reduced, preferably without the drying step. There is provided a curable composition comprising: (A1) a prepolymer represented by (Formula 1): $(CH_2\!=\!C(R^1)\!-\!CO\!-\!O\!-\!R^2\!-\!O\!-\!CO\!-\!NH\!-\!R^3\!-\!NH\!-\!CO)_n\!-\!R^4$ wherein each of $R^1$ is independently a hydrogen atom or a methyl group, each of $R^2$ is independently an aliphatic group having 1 to 8 carbon atoms, each of $R^3$ is independently an aromatic or aliphatic group having 1 to 30 carbon atoms and $R^4$ is an aromatic or aliphatic group having a number average molecular weight at least 500 and having a polycarbonate backbone and/or a polyester backbone and n is an integer from 2 to 4 and (A2) a non-polymer represented by (Formula 2): $(CH_2\!=\!C(R^5)\!-\!CO\!-\!O\!-\!R^6\!-\!O\!-\!CO\!-\!NH)_m\!-\!R^7$ wherein each of $R^5$ is independently a hydrogen atom or a methyl group, each of $R^6$ is independently an aliphatic group having 1 to 8 carbon atoms, $R^7$ is independently an aromatic or aliphatic group having 1 to 30 carbon atoms and m is an integer from 2 to 4.

14 Claims, No Drawings

CURABLE COMPOSITION

This application is a national phase of International Application No. PCT/IB2022/050799 filed Jan. 31, 2022, which claims priority to U.S. Application No. 63/145,520 filed Feb. 4, 2021, the entireties of which are hereby incorporated by reference.

TECHNICAL FIELD

The present invention relates to a curable composition, a curable masking material comprising the curable composition, and a method of producing a bonded body using the curable composition.

BACKGROUND ART

In coating various products, masking is conducted to protect a part of the substrate so that the coating is applied only to the predetermined part. Conventionally, masking has been conducted by a method of applying a film-shaped article such as a tape, but this method is not easy to automate due to the handling properties. Instead of using the film-shaped article, it is known to apply a masking material obtained by dispersing or dissolving a resin in a solvent on a substrate (Patent Documents 1 and 2).

Prior Technical Art

PATENT DOCUMENTS

[Patent Document 1] U.S. Pat. No. 6,284,826B1
[Patent Document 2] US2003/0149164A1

SUMMARY OF INVENTION

Technical Problem

However, such a conventional solvent-type masking material has poor form retention, so the degree of freedom of the coating shape is inferior and the handling properties are a problem. This is a problem, particularly when using a robot or the like to automate a coating process. Further, the conventional solvent-type masking material is not economical since it requires an installation of a drying furnace to improve the peeling performance of the masking material. An object of the present invention is to provide a masking material which is excellent in the shape retention properties, excellent in freedom of a coating shape, capable of quickly being filmed, or excellent in an economic efficiency. The purpose of the present invention is also to provide a masking material that has excellent physical properties (e.g. tear strength) after curing and solves the problem of tearing of the masking material during peeling after curing.

Solution to Problem

One embodiment of the present invention is as follows:
[Item 1]
a curable composition comprising:
a prepolymer (A1) represented by $$(CH_2=C(R^1)-CO-O-R^2-O-CO-NH-R^3-NH-CO)_n-R^4 \quad \text{(Formula 1)}$$

wherein
each of $R^1$ is independently a hydrogen atom or a methyl group,
each of $R^2$ is independently an aliphatic group having 1 to 8 carbon atoms,
each of $R^3$ is independently an aromatic or aliphatic group having 1 to 30 carbon atoms
and
$R^4$ is an aromatic or aliphatic group having a number average molecular weight at least
500 and having a polycarbonate backbone and/or a polyester backbone and
n is an integer from 2 to 4 and
a non-polymer (A2) represented by $$(CH_2=C(R^5)-CO-O-R^6-O-CO-NH)_m-R^7 \quad \text{(Formula 2)}$$

wherein
each of $R^5$ is independently a hydrogen atom or a methyl group,
each of $R^6$ is independently an aliphatic group having 1 to 8 carbon atoms,
$R^7$ is independently an aromatic or aliphatic group having 1 to 30 carbon atoms and
m is an integer from 2 to 4.

[Item 2]
The curable composition according to item 1, wherein a number average molecular weight of the prepolymer (A1) is 1000 to 5000, and a number average molecular weight of the non-polymer (A2) is at most 750.

[Item 3]
The curable composition according to item 1, comprising the prepolymer (A1) at least 15% by weight and the non-polymer (A2) at least 15% by weight.

[Item 4]
The curable composition according to item 1, wherein tan & from 10° C. to 30° C. is at least 0.07 after curing.

[Item 5]
The curable composition according to item 1, comprising acrylic monomer (A3) having one acrylic polymerizable group.

[Item 6]
The curable composition according to item 1, comprising a solid particle (B) at least 10% by weight.

[Item 7]
The curable composition according to item 1, comprising a phosphorus-containing initiator.

[Item 8]
A curable masking material comprising the curable composition according to item 1.

[Item 9]
A producing method of a bonded body comprising:
a masking step comprising masking at least a part of a substrate surface with the curable masking material according to item 8 to provide a masking member;
a curing step comprising curing the masking member;
an exposing step comprising peeling off the masking member to expose a part of the substrate surface; and
a bonding step comprising bonding other member to the exposed part of the substrate surface.

[Item 10]
The producing method according to item 9, further comprising, a painting step comprising painting the substrate.

[Item 11]
The producing method according to item 9, wherein the masking step comprises applying the curable masking material at a thickness of at least 0.1 mm to mask at least a part of the substrate surface.

[Item 12]

The producing method according to item 9, wherein the masking step comprises applying the curable masking material at a width of at least 5 mm to mask at least a part of the substrate surface.

[Item 13]

The producing method according to item 9, wherein the substrate is a resin.

[Item 14]

The producing method according to item 9, wherein a robot is used.

Effects of Invention

Since the curable masking material comprising the curable composition of the embodiment of the present invention is excellent in shape retention, it can be applied only to a desired part and is excellent in the degree of freedom of the coating shape. Furthermore, it is possible to form a film quickly, and is excellent in economy and peeling properties. Thus, since the curable composition of the embodiment of the present invention is excellent in handling properties, automation with a robot or the like is easily achieved, and thereby workability can be improved. Furthermore, the curable composition of the embodiment of the present invention causes less contamination in the substrate and is less likely to adversely affect the subsequent steps. Furthermore, the present invention provides a masking material with excellent physical properties after curing and that can be peeled off smoothly.

DESCRIPTION OF EMBODIMENTS

<Curable Composition>

The curable composition in an embodiment of the present invention comprises a curable composition comprising:

a prepolymer (A1) represented by

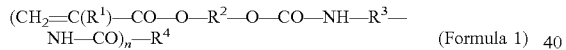

(Formula 1)

wherein
each of $R^1$ is independently a hydrogen atom or a methyl group,
each of $R^2$ is independently an aliphatic group having 1 to 8 carbon atoms,
each of $R^3$ is independently an aromatic or aliphatic group having 1 to 30 carbon atoms and
$R^4$ is an aromatic or aliphatic group having a number average molecular weight at least 500 and having a polycarbonate backbone and/or a polyester backbone and
n is an integer from 2 to 4 and
a non-polymer (A2) represented by

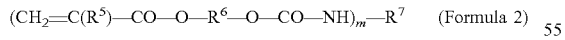

(Formula 2)

wherein
each of $R^5$ is independently a hydrogen atom or a methyl group,
each of $R^6$ is independently an aliphatic group having 1 to 8 carbon atoms,
$R^7$ is independently an aromatic or aliphatic group having 1 to 30 carbon atoms and m is an integer from 2 to 4.

[Prepolymer (A1)]

The curable composition in an embodiment of the present invention comprises a prepolymer (A1) represented by

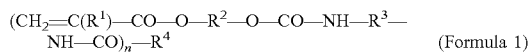

(Formula 1)

wherein
each of $R^1$ is independently a hydrogen atom or a methyl group,
each of $R^2$ is independently an aliphatic group having 1 to 8 carbon atoms,
each of $R^3$ is independently an aromatic or aliphatic group having 1 to 30 carbon atoms and
$R^4$ is an aromatic or aliphatic group having a number average molecular weight at least 500 and having a polycarbonate backbone and/or a polyester backbone and
n is an integer from 2 to 4.

$R^1$ is independently a hydrogen atom or a methyl group.

$R^2$ is an aliphatic group and may be an aliphatic hydrocarbon group, preferably an alkylene group.

The number of carbons in $R^2$ is 1 to 8 and may be at least 1, at least 2, or at least 3, and at most 8, at most 7, or at most 6.

Examples of $R^2$ include an ethylene group, a propylene group, a trimethylene group, and a butylene group.

$R^3$ is an aromatic group or an aliphatic group, and may be an aromatic hydrocarbon group or an aliphatic hydrocarbon group.

The number of carbons in $R^3$ is from 1 to 30, and may be at least 2, at least 4, at least 6, at least 8, or at least 10, and may be at most 28, at most 24, at most 20, or at most 16.

$R^3$ may be a group derived from a diisocyanate compound. In other words, the group may be a diisocyanate compound from which two-NCO groups have been removed. The diisocyanate compound may be an aliphatic diisocyanate or an aromatic diisocyanate. From the viewpoint of post-curing properties, the aliphatic diisocyanates is preferred. The alicyclic diisocyanate may be a monocyclic alicyclic diisocyanate or a polycyclic alicyclic diisocyanate (e.g., bicyclic alicyclic diisocyanate, tricyclic alicyclic diisocyanate, bridged-ring alicyclic diisocyanate).

Specific examples of the diisocyanate compound include
acyclic aliphatic polyisocyanates such as trimethylene diisocyanate, 1,2-propylene diisocyanate, butylene diisocyanate (tetramethylene diisocyanate, 1,2-butylene diisocyanate, 2,3-butylene diisocyanate, 1 2,3-butylenediisocyanate), hexamethylene diisocyanate, pentamethylene diisocyanate, 2,2,4-trimethylhexamethylene diisocyanate, 2,4,4-trimethylhexamethylene diisocyanate, 2,6-diisocyanate methyl caproate, lysine diisocyanate, trimethylhexamethylene diisocyanate, decamethylene diisocyanate, etc.;

monocyclic alicyclic polyisocyanates such as 1,3-cyclopentadiisocyanate, 1,3-cyclopentene diisocyanate, cyclohexane diisocyanate (1,4-cyclohexane diisocyanate, 1,3-cyclohexane diisocyanate), 3-isocyanatomethyl-3,5,5-trimethylcyclohexyl isocyanate (isophorone diisocyanate, IPDI), methylenebis (cyclohexyl isocyanate (4,4'-, 2, 4'- or 2, 2'-methylenebis (cyclohexyl isocyanate or their mixtures) (hydrogenated MDI), methylcyclohexane diisocyanate (methyl-2,4-cyclohexane diisocyanate, methyl-2,6-cyclohexene diisocyanate, bis (isocyanatomethyl) cyclohexane (1,3- or 1,4-bis (isocyanatomethyl) cyclohexane or a mixture thereof) (hydrogenated XDI), dimer acid diisocyanate, transcy-clohexane 1,4-diisocyanate, hydrogen added tolylene diisocyanate (hydrogenated TDI), hydrogenated tetramethyl xylylene diisocyanate (water-added TMXDI), etc.;

multicyclic (e.g. bridged cyclic) alicyclic polyisocyanates such as norbornene diisocyanate, norbornane diisocyanate methyl, bicycloheptane triisocyanate, diisocyanate methyl bicyclo heptane, di (diisocyanatomethyl) tricyclodecane etc;

aromatic diisocyanates such as tolylene diisocyanate (2,4- or 2,6-tolylene diisocyanate or a mixture thereof) (TDI), phenylene diisocyanate (m-, p-phenylene diisocyanate or a mixture thereof, 4,4'-diphenyl diisocyanate, diphenylmethane diisocyanate (4,4'-, 2, 4'- or 2,2'-diphenylmethane diisocyanate or a mixture thereof) (MDI) 4,4'-toluidine diisocyanate (TODI), 4,4'-diphenylether diisocyanate, xylylene diisocyanate (1,3- or 1,4-xylylene diisocyanate or mixtures thereof) (XDI), tetramethyl xylylene diisocyanate (1,3- or 1,4-tetramethyl xylylene diisocyanate or mixtures thereof) (TMXDI), ω, ω'-diisocyanate-1,4-diethylbenzene, naphthalene diisocyanate (1,5-, 1,4- or 1,8-naphthalene diisocyanate or mixture thereof) (NDI), nitrodiphenyl-4,4'-diisocyanate, 3,3'-dimethyldiphenylmethane-4,4'-diisocyanate, 4,4'-diphenylpropane diisocyanate, and 3,3'-dimethoxydiphenyl-4, 4'-diisocyanate.

$R^4$ is an aromatic or aliphatic group with a molecular weight of at least 500 having a polycarbonate and/or polyester backbone.

$R^4$ is n-valent, n is an integer from 2 to 4, preferably 2.

The polycarbonate backbone may be represented by

—[—R$^{41}$—O—C(=O)—O—]$_q$—  (Formula 21)

wherein $R^{41}$ is a divalent hydrocarbon group, and q is an integer.

$R^{41}$ may be aromatic or aliphatic, preferably a linear, branched-chain or cyclic alkylene group, more preferably a linear alkylene group. The number of carbons in $R^{41}$ may be from 1 to 15, for example from 2 to 10, preferably from 3 to 7. Specific examples of $R^{41}$ include a trimethylene group, a propylene group, tetramethylene group, pentamethylene group, hexamethylene group, heptamethylene group, etc. In the polycarbonate backbone, each $R^{41}$ may be the same or different.

q may be at least 3, for example, at least 5, preferably at least 10.

The polycarbonate backbone may be represented by

—[C(=O)—R$^{42}$—O—]$_q$—  (Formula 22)

wherein $R^{42}$ is a divalent hydrocarbon group, and r is an integer.

$R^{42}$ may be a linear, branched-chain, or cyclic alkylene group, preferably a linear alkylene group. The number of carbons in $R^{42}$ may be 1 to 15, for example 2 to 10, preferably 2 to 7. Specific examples of $R^{42}$ include a methylene group, an ethylene group, a trimethylene group, a propylene group, a tetramethylene group, a pentamethylene group, a hexamethylene group and a heptamethylene group. In the polycarbonate backbone, each $R^{42}$ may be the same or different.

r may be at least 3, for example, at least 5, preferably at least 10.

Alternatively, a polyester backbone may be represented by

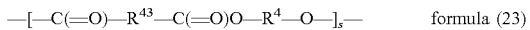

—[—C(=O)—R$^{43}$—C(=O)O—R$^{44}$—O—]$_s$—  formula (23)

wherein each of $R^{43}$ and $R^{44}$ independently is a divalent hydrocarbon, and s is an integer.

For example, $R^{43}$ may be a divalent aromatic group having 6 to 10 carbons (e.g., a phenylene group (p-phenylene group)) or a alkylene group having 1 to 15 carbons (e.g., a alkylene group having 2 to 10 carbons), preferably a alkylene group having 2 to 7 carbons. $R^4$ may be an alkylene group having 1 to 15 carbons, for example, an alkylene group having 2 to 10 carbons, preferably an alkylene group having 2 to 8 carbons.

s may be at least 3, for example, at least 5, preferably at least 10.

The number average molecular weight of $R^4$ is at least 500, and may be at least 750, at least 1000, at least 1250, at least 1500, or at least 2500, preferably at least 750. The number average molecular weight of $R^4$ may be at most 10000, at most 7500, at most 5000, at most 4000, at most 3000, or at most 2500, preferably at most 4000. The number average molecular weight of $R^4$ is preferably at most 4000. The number average molecular weight is a value in terms of polystyrene measured by a gel permeation chromatography (GPC).

The number average molecular weight of the prepolymer (A1) may be at least 750, at least 1000, at least 1500, at least 2000, at least 2500, or at least 3000, preferably at least 1000. The number average molecular weight of the prepolymer (A1) may be at most 10000, at most 7500, at most 5000, at most 4000, at most 3000, or at most 2500, and preferably at most 5000. When the molecular weight is in the above range, it is advantageous in terms of physical properties and viscosity after curing. The number average molecular is a value in terms of polystyrene measured by a gel permeation chromatography (GPC).

The viscosity of the prepolymer (A1) at 40° C. may be at least 1 Pa*s, for example at least 10 Pa*s, and preferably at least 20 Pa*s. The viscosity of the prepolymer (A1) at 40° C. may be at most 200 Pa*s, for example at most 150 Pa*s, and preferably at most 100 Pa*s. When the viscosity of the prepolymer (A1) at 40° C. is in the above range, the coating and peeling properties is more suitable. Viscosity measurement is conducted at a rotation speed of 0.42 rpm and 40° C. using a rheometer (DHR-3 manufactured by TA instruments) equipped with a 20 mm plate.

[Non-Polymer (A2)]

The curable composition in an embodiment of the present invention comprises a non-polymer (A2) represented by

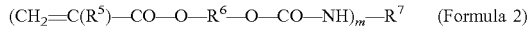

(CH$_2$=C(R$^5$)—CO—O—R$^6$—O—CO—NH)$_m$—R$^7$  (Formula 2)

wherein each of $R^5$ is independently a hydrogen atom or a methyl group, each of $R^6$ is independently an aliphatic group having 1 to 8 carbon atoms, and $R^7$ is independently an aromatic or aliphatic group having 1 to 30 carbon atoms.

m is an integer from 2 to 4].

$R^5$ is independently a hydrogen atom or a methyl group.

$R^6$ is an aliphatic group, may be an aliphatic hydrocarbon group, and preferably an alkylene group.

The number of carbons in $R^7$ has 1 to 8 carbons and may be at least 1, at least 2, at least 3, and may be at most 8, at most 7, or at most 6.

Specific examples of $R^7$ include an ethylene group, a propylene group, a trimethylene group, and a butylene groups.

$R^7$ is an aromatic or aliphatic group, and may be an aromatic hydrocarbon group or an aliphatic hydrocarbon group.

The number of carbons in $R^7$ is 1 to 30, and may be at least 2, at least 4, at least 6, at least 8, or at least 10, and may be at most 28, at most 24, at most 20, or at most 16.

$R^7$ may be a group derived from a polyisocyanate compound. In other words, the group may be a polyisocyanate compound from which m-NCO groups have been removed, m may be an integer from 2 to 4, preferably 2. The polyisocyanate compound may be an aliphatic polyisocyanate or an aromatic polyisocyanate. From the viewpoint of post-curing properties, the aliphatic polyisocyanates is preferred. The alicyclic polyisocyanate may be a monocyclic alicyclic polyisocyanate or a polycyclic alicyclic polyisocyanate (e.g., bicyclic alicyclic polyisocyanate, tricyclic alicyclic polyisocyanate, bridged-ring alicyclic polyisocyanate.).

Examples of the polyisocyanate compound include triphenylmethanetriisocyanate, tris(phenyl isocyanate) thiophosphate, polymethylene polyphenylene polyisocyanate, lysine ester triisocyanate, 1,6,11-undecanetriisocyanate, 1,3,6-hexamethylene triisocyanate, etc., in addition to the diisocyanate compounds in the above explanations of $R^3$.

The number average molecular weight of the non-polymer (A2) may be at least 100, at least 200, at least 300, at least 400, or at least 500. The number average molecular weight of the non-polymer (A2) may be at most 750, at most 700, at most 650, at most 600, at most 550, or at most 500. When the molecular weight is in the above range, it is advantageous in terms of physical properties and viscosity after curing. The number average molecular may be a value in terms of polystyrene measured by a gel permeation chromatography (GPC).

[Other Acrylic Monomer (A3)]

The curable composition may comprise other acrylic monomer (A3). Comprising other acrylic monomer (A3) is advantageous in terms of physical properties after curing.

The number of acrylic polymerization groups (acrylate group, acrylamide group, etc.) in the other acrylic monomers (A3) may be at least 1, at least 2, at least 3, at least 4, or at least 5, and may be at most 6, at most 5, at most 4, at most 3, at most 2, or at most 1, for example, 1, 2, or 3.

The other acrylic monomer (A3) may or may not have urethane and/or urea groups, and preferably do not have them.

The number average molecular weight of the other acrylic monomer (A3) may be at least 100, at least 200, at least 300, at least 400, or at least 500. The number average molecular weight of the other acrylic monomer (A3) may be at most 1000, at most 750, at most 700, at most 650, at most 600, at most 550, or at most 500. The number average molecular may be a value in terms of polystyrene measured by a gel permeation chromatography (GPC).

Examples of the other monomer (A3) include alkyl(meth)acrylates (where the carbon number of the alkyl group may be at least 1, at least 3, at least 5, at least 7, at least 10, at least 12 and may be at most 30, at most 27, at most 24, at most 20, at most 16) such as methyl(meth)acrylate, butyl (meth)acrylate, hexyl(meth)acrylate, isodecyl(meth)acrylate, stearyl(meth)acrylate, isobornyl (meth)acrylate etc.; hydroxy group comprising (meth)acrylate such as hydroxymethyl(meth)acrylate, hydroxyethyl(meth)acrylate, etc.; (poly)alkylene glycol group-containing (meth)acrylates such as diethylene glycol monoethyl ether acrylate, dipropylene glycol monoethyl ether acrylate, polyethylene glycol monoethyl ether acrylate, polypropylene glycol monoethyl ether acrylate, etc. (poly)alkylene glycol group-containing (meth)acrylate; epoxy group-containing (meth)acrylates such as glycidyl(meth)acrylate, (3,4-epoxycyclohexyl) methyl(meth)acrylate, etc.; aromatic group-containing monomers such as styrene, 2-hydroxy-3-phenoxy propyl acrylate, etc.; isocyanate group-containing monomers such as 2-isocyanatoethyl(meth)acrylate, etc.; Si group-containing monomers such as trimethylsilyl acrylate, trialkoxy silyl acrylate, etc.; acid functional group-containing monomers such as (meth) acrylic acid, 3-(acryloyloxy)propane-1-sulfonic salts thereof, etc.; cyclic group-containing monomers such as adamantyl acrylate and cyclohexyl acrylate, etc.; fluoromonomers such as 1H, 1H, 2H, 2H-tridecafluoro-n-octyl(meth)acrylate, etc.; amide monomers such as acrylamide, N-alkyl acrylamide, etc.

[Solid Particles (B)]

The curable composition in the embodiment of the present invention comprises solid particles (B). The solid particles (B) are particles that are solid at normal temperature, and are not particularly limited as long as a curable composition targeted by the present invention can be obtained. Examples of solid particles (B) may include, carbonates, oxides or hydroxides of alkali metals or alkaline earth metals such as calcium carbonate, calcium hydroxide, calcium oxide, magnesium hydroxide etc.; silica such as fumed silica and precipitated silica; carbon such as carbon black, graphite, etc.; mineral fillers such as alumina, talc, mica and clay, etc.; glass beads; balloons such as shirasu balloon, glass balloon, silica balloon, plastic balloon, etc.; inorganic fibers such as glass fiber, metal fiber, etc.; organic fibers such as polyethylene fibers and polypropylene fibers; ceramic fillers such as aluminum borate, silicon carbide, silicon nitride, potassium titanate, magnesium borate and titanium diboride, etc.; and needle-like crystalline fillers such as chrysotile and wollastonite etc. The solid particles (B) may be surface-treated (e.g. fatty acid-treated) particles.

The median particle diameter of the solid particles (B) may be at least 0.003 μm, for example, at least 0.5 μm. The median particle diameter of the solid particles (B) is preferably at most 20 μm, more preferably at most 10 μm, and still more preferably at most 5 μm. The median particle diameter is the 50% diameter of the weight cumulative particle diameter distribution measured by a laser diffraction/scattering type particle diameter distribution measuring device.

The solid particles (B) may be carbonates, oxides or hydroxides of an alkali metal or alkaline earth metal, silica, or alumina or the like, from the viewpoint of improving coating properties and peeling properties, among them, carbonate salts, in particular calcium carbonate, are preferred.

[Polymerization Initiator (C)]

The curable composition of the embodiment of the present invention may comprise a polymerization initiator. The polymerization initiator may be, for example, an initiator that is a photoinitiator and/or a thermal initiator, and is not particularly limited as long as a curable composition targeted by the present invention is obtained. When a curable composition is used for photomasking, a photoinitiator is usually used. Examples of polymerization initiators include benzoin initiators such as benzoin, benzoin methyl ether, benzoin ethyl ether, benzoin n-propyl ether, benzoin isopropyl ether, benzoin butyl ether, 2-allylbenzoin, 2-chlorobenzoin, etc.; acetophenone initiators such as 1-hydroxy-cyclohexyl-phenyl ketone, diethoxyacetophenone, hydroxyacetophenone, 2-hydroxy-2-methyl-1-phenylpropan-1-one, α-aminoacetophenone, 2,2-dimethoxy-1,2-diphenylethane-1-on, etc.; benzophenone initiators such as benzophenone, 4-methylbenzophenone, 4-chlorobenzophenone, 4-chlorobenzophenone, etc.; thioxanthone initiators such as 2-methyl thioxanthone, 2-isopropyl thioxanthone, 2-chlorothioxanthone etc.; azo initiators such as azobisisobutyronitrile; peroxide initiators such as benzoyl peroxide; quinone initiators such as anthraquinone, 2-chloroanthraquinone, phenanthrene, etc.; phosphorus-containing initiators such as: phosphine oxide initiator such as bis (2,4,6-trimethylbenzoyl) phenyl phosphine oxide, bis (2,6-dimethoxybenzoyl)-2,4,4-trimethyl-pentyl phosphine oxide and phosphinate initiators such as ethyl phenyl (2,4,6-trimethylbenzoyl) phosphinate, etc.

The polymerization initiator may comprise a phosphorous-containing initiator, in particular a phosphorous-containing aromatic initiator (e.g. aromatic phosphinate). When the curable composition is applied thick (for example, a thickness of at least 0.2 mm, particularly at least 0.5 mm), the light transmittance decreases exponentially, so there may be problems that the entire curable composition is difficult to cure. In the curable composition of the embodiments of the preset invention, it is possible to have both the curing properties to the deep part and the rapid curing properties by combining the prepolymer (A), solid particles (B) and the phosphorus-containing initiator. This is particularly effective when the curable composition is thick-painted. The peeling properties become better by performing the subsequent steps such as baking coating after sufficient curing.

[Other Components]

The curable composition of the embodiment of the present invention may comprise other components. The other components are not particularly limited as long as the curable composition aimed by the present invention is obtained.

The curable composition may comprise monomers or polymers, other than the prepolymer (A1), non-polymer (A2) and other acrylic monomer (A3) as one of the other components.

The curable composition may comprise an antioxidant as one of the other components. Examples of the antioxidant include phenolic antioxidants (e.g. hindered phenols etc.), aromatic amine antioxidants, sulfur antioxidants, phosphorus antioxidants and the like. By comprising the antioxidant, the peeling properties of the masking material is improved even after high temperature heating.

The curable composition includes other components in an appropriate amount range such as a colorant (e.g. bengara, titanium oxide, other color pigments, dyes, etc.), a solvent (e.g. water, polar organic solvents, nonpolar organic solvents, etc.), silane compounds (e.g. silane compounds having a functional group such as an amino group, a mercapto group, an epoxy group, a (meth) acrylic group, a vinyl group, etc.), epoxy compounds which may have a polyoxyalkylene group, plasticizers, UV absorbers/light stabilizers (e.g. benzotriazole, hindered amines, etc.), thixotropic agents (e.g. colloidal silica, organic bentonite, fatty acid amide, hydrogenated castor oil, etc.), viscosity modifiers, sensitizers, polymerization inhibitors and the like.

[Composition of the Curable Composition]

The amount of prepolymer (A1) may be at least 5% by weight, at least 10% by weight, at least 15% by weight, at least 20% by weight, at least 30% by weight, or at least 40% by weight, and preferably at least 10% by weight, relative to the curable composition. The amount of the prepolymer (A) may be at most 90%, at most 75%, at most 60%, at most 45%, or at most 30% by weight, preferably at most 60% by weight, relative to the curable composition.

The amount of non-polymer (A2) may be at least 5% by weight, at least 10% by weight, at least 15% by weight, at least 20% by weight, at least 30% by weight, or at least 40% by weight, preferably at least 10% by weight, relative to the curable composition. The amount of the non-polymer (A2) may be at most 90%, at most 75%, at most 60%, at most 45%, or at most 30% by weight, preferably at most 60% by weight, relative to the curable composition.

The amount of monomoer (A3) may be at most 30% by weight, at most 25% by weight, at most 20% by weight, at most 15% by weight, or at most 10% by weight relative to the curable composition. In the curable composition, when the amount of monomer (A3) is in the above range, that unreacted material is less likely to remain in the cured product and the substrate is less likely to be contaminated after the masking material is removed.

The amount of solid particles (B) may be 0%, at least 1%, at least 5%, at least 10%, at least 15%, or at least 25% by weight of the curable composition. The amount of solid particles (B) may be at most 65%, at most 50%, at most 35%, or at most 15% by weight relative to the curable composition.

The amount of polymerization initiator (C) may be at least 0.01% by weight, at least 0.05% by weight, at least 0.1% by weight, or at least 0.5% by weight, relative to the curable composition. The amount of polymerization initiator (C) may be at most 5% by weight, at most 4% by weight, at most 3% by weight, at most 2.5% by weight, or at most 2% by weight relative to the curable composition.

The amount of the other component may be at least 0.1% by weight, for example at least 1% by weight, relative to the curable composition. The amount of the other component may be at most 25% by weight, for example at most 10% by weight, relative to the curable composition. The weight percentages may be based on the portion excluding the solvent.

In the curable composition, the content of the antioxidant may be at least 0.01% by weight, at least 0.1% by weight, at least 0.3% by weight, at least 0.5% by weight, or at least 1% by weight. The content of the antioxidant may be at most 7.5%, at most 5%, at most 3.5%, at most 1.5%, or at most 1% by weight.

[Viscosity of the Curable Composition]

The viscosity of the curable composition at 40° C. may be at least 10 Pa*s, at least 20 Pa*s, or at least 30 Pa*s, for example at least 50 Pa*s, and preferably at least 100 Pa*s. The viscosity of the curable composition at 40° C. may be at most 300 Pa*s, at most 250 Pa*s, or at most 200 Pa*s, and preferably at most 180 Pa*s. The TI (thixotropy index) value at 40° C. of the curable composition may be at least 0.3, at least 0.6, or at least 0.8, for example, at least 1. The TI value at 40° C. of the curable composition is at most 3, at most 2.5, or at most 2, and preferably at most 1.8. The curable compositions of embodiments of the present invention may be in the form of a fluid that exhibits the above viscosity or TI value. When the viscosity or TI value of the curable composition is in the above range, the coating properties and the peeling properties are more preferable. The TI value is calculated from the ratio of the viscosity at 0.42 rpm to the viscosity at 4.2 rpm.

[Viscoelasticity of the Curing Composition after Curing]

The curable composition after curing (i.e., cured material) may have a tan δ of at least 0.07, at least 0.08, at least 0.09, at least 0.10, at least 0.11, at least 0.12, at least 0.13, or at least 0.14, preferably at least 0.08, and more preferably at least 0.10 in the range of 10° C. to 30° C. The curable composition after curing (i.e., cured material) may have a tan δ of at most 0.50, at most 0.40, at most 0.30, at most 0.25, at most 0.20, or at most 0.18, preferably at most 0.25, and more preferably at most 0.20, in the range of 10° C. to 30° C. By using the curable composition in the present application, a cured material having the above-described specific tan δ is obtained, and good physical properties of the cured material are developed. Tan δ is measured at a rate of 1 Hz and 1° C./second, for example by using a Perkin Elmer DMA 8000.

<Curable Masking Material>

The curable masking material of the embodiment of the present invention is not particularly limited as long as it comprises the curable composition and can mask part of the substrate. By using a masking material to mask the substrate surface during coating, it is possible to prevent the masked substrate surface from being applied.

<Method for Producing Bonded Body>

The present invention further provides a new method of producing a bonded body, which comprises a masking step, a curing step, an exposing step, and a bonding step. Furthermore, the method may further comprise a painting step after the masking step (preferably after the curing step) and before the exposing step.

In the method for producing the bonded body according to an embodiment of the present invention, it is possible to form a film with reducing the drying step or without the drying step although it may be subjected to a drying step if necessary. From the viewpoint of workability, it is preferable to reduce the drying step, and more preferably, conduct without the drying step. Therefore, the drying oven may not be required.

[Masking Step]

The masking step comprises providing a masking member that masks at least a part of the substrate surface. The masking member is obtained by applying the above-mentioned curable masking material on the substrate surface.

The curable masking material may be applied in the form of wide thick film beads. The shape of the nozzle may be a round bead nozzle, a wide and thin bead nozzle, a flat nozzle and a fan-like nozzle, and may be selected according to the purpose. If a certain degree of wide masking is required, a wide and thin bead nozzle or fan-like nozzle is preferred. It is also possible to coat in a wider width by a method using a shot nozzle, a slit nozzle or the like or a method using a swirl coating, a spray coating with adjusting the discharge speed. For example, the curable composition may be supplied on the substrate from a container via a material supply hose with the use of a supply pump. It is possible to conduct an automatic coating to a target part with a coating dispenser fixed to a robot. A metering pump may be placed between the feed pump and the dispenser so as to stabilize the supplied amount of the masking material. A feed pump or dispenser with a metering device may be used.

The coating thickness of the curable masking material may be at least 0.1 mm, at least 0.2 mm, at least 0.5 mm, at least 1 mm, at least 1.5 mm, at least 3 mm, or at least 5 mm. The coating thickness of the curable masking material may be at most 30 mm, at most 15 mm, or at most 10 mm. When the coating thickness is in the above range, the painting film and the masking material after curing hardly become integrated after painting, so it becomes easy to peel off only the masking material. Thereby, for example, it becomes easier to automatically peel off the masking material with a gripper, a peeler and the like equipped in the robot.

The coating width of the curable masking material may be at least 3 mm, at least 5 mm, or at least 10 mm. The coating width of the curable masking material may be at most 75 mm, at most 50 mm, or at most 30 mm.

The above-mentioned coating thickness and coating width of the curable masking material may mean the thickness and width after curing or coating.

The substrate material is not limited and may be metal (for example, steel), resin (for example, acrylic resin, olefin resin (typically polypropylene), polyamide resin, polyimide resin, polycarbonate resin, etc.), glass, ceramic and the like.

[Curing Step]

The curing step comprises curing the masking member. The masking member in the embodiment of the present invention is excellent in fast curing. In addition, in the embodiment of the present invention, the cured material obtained by curing the masking member has moderate flexibility and toughness, which does not easily break at the time of peeling.

The curing of the masking member in the embodiment of the present invention is conducted by activating the polymerization initiator and advancing the polymerization. Curing of the masking member may be conducted by light irradiation or heating of the curable composition. From the viewpoint of workability, curing is preferably conducted by light irradiation (for example, UV irradiation, visible light irradiation, etc.).

When the curable masking material is photocurable, it may be cured by passing the material through a conveyor having a light source (for example, a UV light source or a visible light source) inside, or a method of irradiating a coating portion with a robot holding a light source. Furthermore, the dispenser for coating and the light source may be equipped with the same robot to simultaneously perform coating and curing. As a light source, a conventional light source such as an incandescent lamp, a fluorescent lamp, a halogen lamp, a mercury lamp, and a xenon lamp may, etc. or an LED light source may be used.

The wavelength used for photocuring may be 100 to 900 nm, for example 200 to 500 nm, preferably 300 to 450 nm. The irradiance may be at least 100 mW/cm$^2$, for example, at least 200 mW/cm$^2$ and may be at most 100 W/cm$^2$, for example at most 50 W/cm$^2$. Since the curable composition in the embodiment of the present invention has improved rapid curing properties, the workability can be improved. From the viewpoint of workability, the light irradiation time may be at most 1 minute, preferably at most 30 seconds, more preferably at most 10 seconds, still more preferably at most 5 seconds, still more preferably at most 3 seconds, particularly preferably at most 1 second and may be at least 0.1 seconds, for example, at least 0.3 seconds.

When the curable masking material is thermosetting, it may be cured by using an oven, a hot air apparatus, a near infrared lamp, or a robot equipped with these. The heating temperature may be 80 to 150° C., preferably 60 to 130° C., more preferably 70° C. to 120° C. The heating time for curing may be at most 1 minute, preferably at most 30 seconds, more preferably at most 10 seconds, from the viewpoint of workability.

Conventionally, when the masking material is applied as a thick film, even if it is subjected to curing treatment such as light irradiation or heating, the entire masking material cannot be cured, and there is a problem that the residue adheres to the substrate. The curable masking material in the embodiment of the present invention can be cured quickly and has adequate mechanical strength after curing and heating, and therefore, the entire masking material can be peeled off integrally without break even when applied as a wide and thick film. Furthermore, since the curable masking material in the present invention does not contaminate the substrate after peeling, the adhesion is not adversely affected when the adhesive is applied to the exposed surface.

[Painting Step]

The painting step comprises painting substrate surface after the masking step (preferably after the curing step) and before the exposed step. The painting may be conducted by various methods such as brush painting, spray painting, dip painting, powder painting, electrostatic painting, photocuring painting, and baking painting. For painting and drying, it may be heated to at least 80° C., for example, at least 100° C., at least 120° C., at least 150° C., or at least 180° C. The heating time may be 30 seconds to 600 minutes, for example, 5 minutes to 150 minutes.

[Exposing Step]

The exposing step comprises peeling off the masking member after curing to expose at least a part of the substrate surface.

[Bonding Step]

The bonding step comprises bonding other member to the exposed part of the substrate surface. An adhesive may be applied to the substrate surface to bond other components. The substrate surface may be subjected to pretreatment such as primer treatment before applying the adhesive. Using the curable masking material in the embodiment of the present invention, the adhesiveness between the substrate surface and other members is excellent since an adhesion inhibitory component does not remain on the substrate surface after peeling off the masking member from the substrate. Other member may be bonded to the substrate surface without pretreatment such as a primer treatment.

EXAMPLES

The present invention will be more specifically described below by showing Examples and Comparative Examples, but the present invention is not limited by these examples. In addition, parts and % are based on weight parts unless otherwise specified.

The meanings of the abbreviations are as follows.

HEA: Hydroxyethyl Acrylate
HDI: Hexamethylene diisocyanate
IPDI: Isophorone Diisocyanate
UH200: Eternacoll UH-200 (Polycarbonate diol, Mn=2000, manufactured by Ube Industries, Ltd.)
2200A: CAPA2200A (Polyester diol, Mn=2000, manufactured by Ingevity)

the above added with a bond (—) (e.g. HEA-) means the derivative structure derived therefrom.

The test methods are as follows.

[Photocuring]

The photocuring was conducted under the following conditions.
Wavelength: 395 nmUV
Light source: LED14 W/cm$^2$ distance 1 inch
Light irradiation time: 3 seconds

[Painting]

Painting was conducted by baking painting under the following conditions.
Paint: Acrylic paint
Condition: 40 minutes at 100° C. or 140° C.

[Tan Delta]

Tan Delta was recorded using a Perkin Elmer DMA 8000 from at least −70° C. to 120° C. at 1 Hz and a rate of 1° C./second.

[Tensile Strength]

A cured sheet material about 0.1-1 mm thick was prepared according to JIS K 6251 or ASTM D412. The sheet material was then punched to prepare the sheet of dumbbell shape No. 2 and the tensile strength was measured at speed 300 mm/min with a testing machine.

[Elongation]

The maximum elongation when measuring the tensile strength was measured according to JISK6251 or ASTM D412.

[Tear Strength]

A cured sheet of material, about 0.35 mm thick, was prepared according to ASTM D 624. The sheet material was then punched to prepare the sheet of shape Die C and the tear strength was measured at speed 500 mm/min on the electromechanical instrument.

[Evaluation of Peeling Properties (with No Paint)]

The curable composition was applied to a substrate (polypropylene resin) at a certain thickness and UV-cured in the above condition, and the cured material was peeled off from the substrate by hand to evaluate peeling properties. In addition, it was also evaluated whether a break easily occurred when peeling by hand. Evaluation criteria are as follows:

| | | |
|---|---|---|
| ✓ | Excellent | Easily peeled from substrate without a tear and no residue remained on substrate. |
| ○ | Good | Easily peeled from substrate; some minor tearing but easy to restart peel; no residue remained on substrate. |
| Δ | Satisfactory | Adhered more strongly to substrate to cause some minor tearing, but can be restarted with little effort; no residue remained on substrate. |
| X | Poor | Not peeled easily or tears, difficult to restart to peel after tear; residue remained on substrate. |

[Evaluation of Peeling Properties (After Paint Process)]

The curable composition was applied to a substrate (PP) at a certain thickness and UV-cured in the above condition. Following cure of the composition, the substrate and composition were painted with a topcoat then a clear coat. The cured material was then peeled from the substrate and evaluated as follows:

| | | |
|---|---|---|
| ✓ | Excellent | Easily peeled completely from substrate and does not tear into non masked paint area; no residue remained on substrate |
| ○ | Good | Easily peeled completely from substrate, some minor tearing into the non-masked paint area; no residue remained on substrate |
| Δ | Satisfactory | Adhered more strongly to substrate to cause some minor tearing but can be restarted with little effort; some minor material trapped under <1 mm wide of paint on both sides; no residue remained on substrate |
| X | Poor | Not peeled easily or tears, difficult to restart after tear; Residue remains on substrate. |

[Adhesiveness after Removal of Masking Member]

The adhesion test was conducted after coating the masking material, curing painting and removal of the masking member. The primer was applied to the substrate surface.

After 5 minutes, the adhesive was applied thereto. After 7 days of curing under a standard condition (20° C.×65%), the adhesion test was conducted. The adhesion test was conducted according to the peel adhesion evaluation method of JASO M 338-89.
Primer: 435-97 (Sunstar Engineering, Inc.)
Adhesive: Penguin Cemment #560 (SunStar Engineering, Inc.)
Evaluation criteria are as follows:

| | | |
|---|---|---|
| ○ | Good | cohesive failure |
| Δ | Satisfactory | at least 50% cohesive failure (partially interface failure) |
| X | Poor | at least 50% interface failure |

[Synthesis]
The synthesis method is as follows.
Acrylic Component 3
To a reaction kettle equipped with a stirring blade, 1000 g of polycarbonate diol (UH-200 manufactured by Ube Industries, Ltd.) having a hydroxyl value of 56 and 659 g of excess isophorone diisocyanate (IPDI) were added and the reaction was carried out at 70° C. for 3 hours with stirring to obtain a mixture of isocyanate-terminated prepolymer with 12.6% NCO and the monomer. In addition, 573 g of hydroxyethyl acrylate (HEA) was added, and the reaction was carried out at 80° C. for 3 hours under a nitrogen atmosphere to obtain a mixture of acrylate-both-terminated polycarbonate prepolymer and urethane diacrylate. The calculated ratio of the prepolymer to urethane diacrylate was 60:40.
Acrylic Component 4
To a reaction kettle equipped with a stirring blade, 1000 g of polycarbonate diol (UH-200 manufactured by Ube Industries, Ltd.) having a hydroxyl value of 56 and 455 g of excess isophorone diisocyanate (IPDI) were added and the reaction was carried out at 70° C. for 3 hours with stirring to obtain a mixture of isocyanate-terminated prepolymer with NCO 8.95% and the monomer. In addition, 359 g of hydroxyethyl acrylate (HEA) was added, and the reaction was carried out at 80° C. for 3 hours under a nitrogen atmosphere to obtain a mixture of acrylate-both-terminated polycarbonate prepolymer and urethane diacrylate. In addition, 96 g of isobornyl acrylate was added, and then cooled. The calculated ratio of prepolymer, urethane diacrylate and monoacrylate was 70:25:5.
Acrylic Component 5
To a reaction kettle equipped with a stirring blade, 1000 g of polyester diol (CAPA2200A manufactured by Ingevity) having a hydroxyl value of 56 and 503 g of excess hexamethylene diisocyanate (HDI) were added, and the reaction was carried out for 3 hours at 70° C. with stirring to obtain a mixture of isocyanate-terminated prepolymer with 13.9% NCO and monomer. In addition, 579 g of hydroxyethyl acrylate (HEA) was added, and the reaction was carried out at 80° C. for 3 hours under a nitrogen atmosphere to obtain a mixture of acrylate-both-terminated polycarbonate prepolymer and urethane diacrylate. The calculated ratio of prepolymer to urethane diacrylate was 60:40.
Acrylic Component 6
To a reaction kettle equipped with a stirring blade, 1000 g of polyester diol (CAPA2200A manufactured by Ingevity) having a hydroxyl value of 56 and 455 g of excess isophorone diisocyanate (IPDI) were added, and the reaction was carried out for 3 hours at 70° C. with stirring to obtain a mixture of isocyanate-terminated prepolymer with 8.95% NCO and monomer. In addition, 359 g of hydroxyethyl acrylate (HEA) was added and reacted at 80° C. for 3 hours under a nitrogen atmosphere to obtain a mixture of acrylate-both-terminated polycarbonate prepolymer and urethane diacrylate. In addition, 96 g of isobornyl acrylate was added, and then cooled. The calculated ratio of prepolymer, urethane diacrylate and monoacrylate was 70:25:5.

[Examples 1 to 16, Comparative Examples 1 to 5]

The raw materials shown in Table 1 were mixed by the planetary mixer in the for-mulation (parts by weight) shown in Table 1 to obtain a curable composition. Each raw material in the Table is its main component, which may contain manufacturing by-products such as multimers (e.g., dimers). The above tests were conducted for the obtained curable compositions. The test results are shown in Table 2.

TABLE 1

| Raw Materials | Notes | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Acrylic Component 1 | Prepolymer (A1): 20% Non-polymer (A2): 80% | 29 | 24 | 21.9 | 21.9 | 25 | 20 | | 40 | 20.8 | | |
| Acrylic Component 2 | Prepolymer (A1): 75% Acrylic monomer (A3) (acrylate): 25% | 70 | 75 | 51.1 | 51.1 | 48 | | 70 | 33 | 48.5 | | |
| Acrylic Component 3 | Prepolymer (A1): 60% Non-polymer A2: 40% | | | | | | | | | | 73 | |
| Acrylic Component 4 | Prepolymer (A1): 70% Non-polymer (A2): 25% Acrylic monomer (A3) (mono-acrylate): 5% | | | | | | | | | | | 73 |
| Acrylic Component 5 | Prepolymer (A1): 60% Non-polymer (A2): 40% | | | | | | | | | | | |
| Acrylic Component 6 | Prepolymer (A1): 70% Non-polymer (A2): 25% Acrylic monomer (A3) (mono-acrylate): 5% | | | | | | | | | | | |
| Acrylic Component 7 | Prepolymer (A1): 0% Non-polymer (A2): 100% | | | | | | | | | | | |
| Acrylic Component 8 | Urethane di-acrylate | | | | | 6 | 29.1 | | | | | |
| Acrylic Component 9 | Urethane di-acrylate | | | | | | | | 29 | | | |

TABLE 1-continued

| Raw Materials | Notes | | | | | | | | | | | |
|---|---|---|---|---|---|---|---|---|---|---|---|---|
| Acrylic Component 10 | Acrylic monomer (A3) (mono-acrylate): 100% | | | | | | | | | | | |
| Acrylic Component 11 | Acrylic monomer (A3) (di-acrylate): 100% | | | | | | | | | | | |
| Acrylic Component 12 | Acrylic monomer (A3) (Acrylate Siloxane) | | | | | | 5 | | | | | |
| Plasticizer | | | | | | | | | | 5 | | |
| Initiator 1 | | 1 | 1 | 1 | 1 | 1 | 0.9 | 1 | 1 | 1 | 1 | 1 |
| Non-treated CaCO3 | | | | 15 | 15 | 18 | 45 | | 15 | 14.3 | 15 | 15 |
| Treated CaCO3 | | | | | | | | | | | | |
| Wollastanite | | | | 10 | 10 | 1 | | | 10 | 9.4 | 10 | 10 |
| Antioxidant | | | | 1 | 1 | 1 | | | 1 | 1 | 1 | 1 |
| Total | | 100 | 100 | 100 | 100 | 100 | 100 | 100 | 100 | 100 | 100 | 100 |
| Prepolymer A1/Composition | | 58% | 61% | 43% | 43% | 41% | 4% | 53% | 33% | 41% | 44% | 51% |
| Prepolymer A1/Acrylic Component | | 59% | 62% | 59% | 59% | 52% | 7% | 53% | 45% | 58% | 60% | 70% |

| | | Example | | | | | Com. Example | | | | |
|---|---|---|---|---|---|---|---|---|---|---|---|
| Raw Materials | Notes | 12 | 13 | 14 | 15 | 16 | 1 | 2 | 3 | 4 | 5 |
| Acrylic Component 1 | Prepolymer (A1): 20% Non-polymer (A2): 80% | | | | | | | | | | |
| Acrylic Component 2 | Prepolymer (A1): 75% Acrylic monomer (A3) (acrylate): 25% | | | | | | | | | | |
| Acrylic Component 3 | Prepolymer (A1): 60% Non-polymer A2: 40% | | | 33 | 53 | | | | | | |
| Acrylic Component 4 | Prepolymer (A1): 70% Non-polymer (A2): 25% Acrylic monomer (A3) (mono-acrylate): 5% | | | | | | | | | | |
| Acrylic Component 5 | Prepolymer (A1): 60% Non-polymer (A2): 40% | 73 | | 40 | | 40 | | | | | |
| Acrylic Component 6 | Prepolymer (A1): 70% Non-polymer (A2): 25% Acrylic monomer (A3) (mono-acrylate): 5% | | 73 | | | | | | | | |
| Acrylic Component 7 | Prepolymer (A1): 0% Non-polymer (A2): 100% | | | 10 | 15 | | | 10 | | 20 | |
| Acrylic Component 8 | Urethane di-acrylate | | | | | | | | 63 | 53 | 38.8 |
| Acrylic Component 9 | Urethane di-acrylate | | | | 10 | 18 | | | | | |
| Acrylic Component 10 | Acrylic monomer (A3) (mono-acrylate): 100% | | | | | | 40 | | | | |
| Acrylic Component 11 | Acrylic monomer (A3) (di-acrylate): 100% | | | | | | | 40 | | | |
| Acrylic Component 12 | Acrylic monomer (A3) (Acrylate Siloxane) | | | | | | | | | | |
| Plasticizer | | | | | | | | | | | |
| Initiator 1 | | 1 | 1 | 1 | 1 | 1 | 1 | 1 | 1 | 1 | 1.2 |
| Non-treated CaCO3 | | 15 | 15 | 15 | 15 | 15 | 49 | 49 | 15 | 15 | 60 |
| Treated CaCO3 | | | | | | | 10 | 10 | | | |
| Wollastanite | | 10 | 10 | 10 | 10 | 10 | | | 10 | 10 | |
| Antioxidant | | 1 | 1 | 1 | 1 | 1 | | | 1 | 1 | |
| Total | | 100 | 100 | 100 | 100 | 100 | 100 | 100 | 100 | 100 | 100 |
| Prepolymer A1/Composition | | 44% | 44% | 44% | 32% | 24% | 0% | 0% | 0% | 0% | 0% |
| Prepolymer A1/Acrylic Component | | 60% | 60% | 60% | 44% | 33% | 0% | 0% | 0% | 0% | 0% |

Values are parts by weight

| Raw Materials | Notes |
|---|---|
| Acrylic Component 1 | CN983 (Arkema): HEA-HDI-Polyesterdiol-HDI-HEA 10-30% HEA-HDI-HEA 70-90% |
| Acrylic Component 2 | CN9021 (Arkema): HEA-HDI-Polycarbonatediol-HDI-HEA 60-90% Acrylic Ester 10-30% Alcohol 1-5% |
| Acrylic Component 3 | Prepolymer (HEA-IPDI-UH200-IPDI-HEA) 60% Urethane Acrylate (HEA-IPDI-HEA) 40% |
| Acrylic Component 4 | Prepolymer (HEA-IPDI-UH200-IPDI-HEA) 70% Urethane Acrylate (HEA-IPDI-HEA) 25% Isobornyl Acrylate 5% |
| Acrylic Component 5 | Prepolymer (HEA-HDI-2200A-IPDI-HEA) 60% Urethane Acrylate (HEA-HDI-HEA) 40% |
| Acrylic Component 6 | Prepolymer (HEA-IPDI-2200A-IPDI-HEA) 70% Urethane Acrylate (HEA-IPDI-HEA) 25% Isobornyl Acrylate 5% |
| Acrylic Component 7 | HEA-HDI-HEA |
| Acrylic Component 8 | Ebecryl 230: Aliphatic urethane diacrylate |
| Acrylic Component 9 | Genomer 4425: Aliphatic urethane acrylate 50-70% glycerol, propoxylated esters with acrylic acid 25-50% |
| Acrylic Component 10 | Isodecyl Acrylate (Non-urethane Monoacrylate) |
| Acrylic Component 11 | Hexapropylene glycol Diacrylate (Non-urethane Diacrylate) |

-continued

| Raw Materials | Notes |
|---|---|
| Acrylic Component 12 | Ebecryl 350: Acrylate Siloxane |
| Plasticizer | DINP |
| Initiator | Ethyl (2,4,6-trimethylbenzoyl) phenyl phosphinate (Irgacure TPO-L/Genocure TPO-L) |
| Non-treated CaCO3 | Vicron 31-6/Specialty Minerals Inc. particle diameter 3.6 μm |
| Treated CaCO3 | hakuenkaCCR/Shiraishi Industry Co., Ltd. particle diameter 0.08 μm |
| Wollastanite | Nyad 32SM |
| Antioxidant | AO60P/ADEKA |

TABLE 2

| Results | Example |  |  |  |  |  |  |  |  |  |  |  |
|---|---|---|---|---|---|---|---|---|---|---|---|---|
|  | 1 | 2 | 3 | 4 | 5 | 6 | 7 | 8 | 9 | 10 | 11 | 12 |
| Thickness of film (mm) | 0.7 | 0.5 | 0.35 | 0.5 | 0.5 | 0.5 | 0.5 | 0.5 | 0.35 | 0.5 | 0.35 | 0.5 |
| Tan delta at 10° C.-30° C. | 0.08-0.12 | 0.12-0.18 | 0.13-0.24 | 0.13-0.24 | 0.10-0.16 | 0.10-0.17 | 0.10-0.18 | 0.07-0.15 | 0.07-0.12 | 0.12-0.18 | 0.13-0.20 | 0.10-0.21 |
| Tensile Strength (Mpa) | 10 | 8 | 9 | 8.7 | 8.1 | 7.5 | 7.0 | 11 | 10.5 | 4.8 | 4.8 | 5.5 |
| Elongation (%) | 50 | 56 | 23 | 14 | 30 | 40 | 35 | 40 | 60 | 100 | 120 | 80 |
| Tear Strength (kN/m) | 23.4 | 18.3 | 22.9 | 23.2 | 17.8 | 14.5 | 10.2 | 15.5 | 20.5 | 20.5 | 23.4 | 25.2 |
| Peeling Properties Initial | ✓ | ✓ | ✓ | ✓ | ✓ | ✓ | ○ | ✓ | ○ | ✓ | ✓ | ✓ |
| After Heat 100° C. × 40 min | ✓ | ✓ | ✓ | ✓ | ✓ | ✓ | ○ | ✓ | ○ | ✓ | ✓ | ✓ |
| After Heat 140° C. × 40 min | ✓ | ✓ | ✓ | ✓ | ✓ | ✓ | ○ | Δ | ○ | ✓ | ✓ | ✓ |
| After Paint Process | ✓ | ✓ | ✓ | ✓ | ○ | ○ | ○ | Δ | ○ | ✓ | ✓ | ✓ |
| Adhesiveness after Removal | ○ | ○ | ○ | ○ | ○ | ○ | ○ | ○ | ○ | ○ | ○ | ○ |

| Results | Example |  |  |  | Com. Example |  |  |  |  |
|---|---|---|---|---|---|---|---|---|---|
|  | 13 | 14 | 15 | 16 | 1 | 2 | 3 | 4 | 5 |
| Thickness of film (mm) | 0.35 | 0.5 | 0.5 | 0.35 | 0.5 | 0.5 | 0.5 | 0.35 | 0.5 |
| Tan delta at 10° C.-30° C. | 0.15-0.22 | 0.10-0.20 | 0.08-0.15 | 0.08-0.12 | 0.01-0.08 | 0.01-0.08 | 0.01-0.08 | 0.01-0.08 | 0.02-0.07 |
| Tensile Strength (Mpa) | 5 | 5 | 7.8 | 8.8 | <0.8 | <0.8 | 6 | 9 | 2.3 |
| Elongation (%) | 80 | 90 | 45 | 50 | <10 | <10 | 100 | 50 | 90 |
| Tear Strength (kN/m) | 20.9 | 21.3 | 18.2 | 17.2 | <5 | <5 | 8 | 7 | 10 |
| Peeling Properties Initial | ✓ | ✓ | ✓ | ✓ | Δ | Δ | ○ | ○ | ○ |
| After Heat 100° C. × 40 min | ✓ | ✓ | ✓ | ✓ | Δ | Δ | ○ | ○ | ○ |
| After Heat 140° C. × 40 min | ✓ | ✓ | ○ | Δ | X | X | Δ | Δ | Δ |
| After Paint Process | ✓ | ✓ | ○ | Δ | X | X | X | X | Δ |
| Adhesiveness after Removal | ○ | ○ | ○ | ○ | ○ | ○ | ○ | ○ | ○ |

INDUSTRIAL APPLICABILITY

The present invention can be used, for example, in various manufacturing processes that require masking of members. For example, the curable composition in the present invention can be suitably used as a masking material used in a manufacturing process (for example, a manufacturing process of an automobile) automated by a robot or the like.

The invention claimed is:

1. A curable composition comprising:
(A1) a prepolymer represented by $$(CH_2=C(R^1)-CO-O-R^2-O-CO-NH-R^3-NH-CO)_n-R^4 \quad \text{(Formula 1)}$$

wherein
each of $R^1$ is independently a hydrogen atom or a methyl group,
each of $R^2$ is independently an aliphatic group having 1 to 8 carbon atoms,
each of $R^3$ is independently an aromatic or aliphatic group having 1 to 30 carbon atoms and
$R^4$ is an aromatic or aliphatic group having a number average molecular weight at least 500 and having a polycarbonate backbone and/or a polyester backbone and n is an integer from 2 to 4 and
(A2) a non-polymer represented by $$(CH_2=C(R^5)-CO-O-R^6-O-CO-NH)_m-R^7 \quad \text{(Formula 2)}$$

wherein
each of $R^5$ is independently a hydrogen atom or a methyl group,
each of $R^6$ is independently an aliphatic group having 1 to 8 carbon atoms,
$R^7$ is independently an aromatic or aliphatic group having 1 to 30 carbon atoms and
m is an integer from 2 to 4.

2. The curable composition according to claim 1, wherein a number average molecular weight of the prepolymer (A1) is 1000 to 5000, and a number average molecular weight of the non-polymer (A2) is at most 750.

3. The curable composition according to claim 1, comprising the prepolymer (A1) at least 15% by weight and the non-polymer (A2) at least 15% by weight.

4. The curable composition according to claim 1, wherein tan & from 10° C. to 30° C. is at least 0.07 after curing.

5. The curable composition according to claim 1, comprising other acrylic monomer (A3).

6. The curable composition according to claim 1, comprising a solid particle (B) at least 10% by weight.

7. The curable composition according to claim 1, comprising a phosphorus-containing initiator.

8. A curable masking material comprising the curable composition according to claim 1.

9. A producing method of a bonded body comprising:
a masking step comprising masking at least a part of a substrate surface with the curable masking material according to claim 8 to provide a masking member;
a curing step comprising curing the masking member;
an exposing step comprising peeling off the masking member to expose a part of the substrate surface; and
a bonding step comprising bonding other member to the exposed part of the substrate surface.

10. The producing method according to claim 9, further comprising,
a painting step comprising painting the substrate.

11. The producing method according to claim 9, wherein the masking step comprises applying the curable masking material at a thickness of at least 0.1 mm to mask at least a part of the substrate surface.

12. The producing method according to claim 9, wherein the masking step comprises applying the curable masking material at a width of at least 5 mm to mask at least a part of the substrate surface.

13. The producing method according to claim 9, wherein the substrate is a resin.

14. The producing method according to claim 9, wherein a robot is used.

* * * * *